United States Patent [19]

Cromeens

[11] 4,246,943
[45] Jan. 27, 1981

[54] INFEED ASSEMBLY FOR RANDOM LENGTH END SHAPING MACHINES

[75] Inventor: Gary L. Cromeens, Mesquite, Tex.

[73] Assignee: Industrial Woodworking Machine Co. Inc., Garland, Tex.

[21] Appl. No.: 70,708

[22] Filed: Aug. 29, 1979

[51] Int. Cl.³ .............................................. B27B 27/00
[52] U.S. Cl. ................................. 144/245 R; 83/423; 83/435.1; 144/91; 144/134 R; 144/245 E; 198/488; 198/744
[58] Field of Search ............... 198/739, 740, 774, 776, 198/744, 488, 430; 144/245 R, 245 E, 91, 134 R; 83/435.1, 437, 423

[56] References Cited

U.S. PATENT DOCUMENTS

| 1,659,574 | 2/1928 | Lloyd | 144/245 R X |
| 3,590,987 | 7/1971 | Evans | 198/774 X |
| 3,951,189 | 4/1976 | Cromeens | 144/91 |

Primary Examiner—Robert B. Reeves
Assistant Examiner—Douglas D. Watts
Attorney, Agent, or Firm—Joseph H. Schley; Thomas L. Cantrell

[57] ABSTRACT

An infeed assembly or mechanism for advancing wood sticks of random length through an end shaping machine or woodworking apparatus that has at least one end shaper and means for holding the sticks against displacement, while permitting travel thereof through the machine, in coaction with an underlying table that supports said sticks during the shaping of their ends as well as throughout the advancement thereof; said infeed assembly is composed of a feed shuttle mounted for reciprocal movement in a generally elliptical path or rhombic orbit longitudinally of the table and having upstanding means for projection above said table and engagement with said sticks during the feed stroke and for retraction below said table during the return stroke of said shuttle.

10 Claims, 10 Drawing Figures

INFEED ASSEMBLY FOR RANDOM LENGTH END SHAPING MACHINES

BACKGROUND OF THE INVENTION

Various types of infeed assemblies or mechanisms have been and are in use for advancing work of random length, such as wood sticks and/or blocks through end shaping machines and many of these assemblies are of the endless conveyor types while others are of the planar reciprocal or shuttle type having retroctable work pushing elements pivotally mounted on a slidable rail, rack or other member. Heretofore, the infeed assemblies of end shaping machines or woodworking apparatuses have been unable to handle sticks that vary appreciably in length without expensive and complicated construction.

The pertinent prior art includes the following U.S. Pat. Nos:
Lloyd, 1,659,574
Miller et al, 1,838,780
Muhl et al, 2,302,878
Hochstetler, 3,580,309
Kvalheim, 3,665,982
Sandberg, 3,838,723
Ekholm, 4,009,630
Whitten, 4,098,154.

SUMMARY OF THE INVENTION

The novel infeed assembly or mechanism of this invention is adapted to handle wood sticks of random length and to advance the sticks intermittently through an end shaping machine or woodworking apparatus that has at least one end shaper, a table for supporting said sticks and coacting holddown means for preventing displacement of said sticks during the shaping of their ends while permitting travel thereof through the machine or apparatus. This infeed assembly or mechanism has feed shuttle means mounted for reciprocal movement in a generally elliptical path or rhombic orbit longitudinally of the table and pivotally connected to slidable support means as well as to actuating means for imparting reciprocation to the shuttle means. Spaced link means extend between and pivotally attach the feed shuttle and actuating means to the slidable support means in spaced relationship, whereby said actuating means swings the link means about its pivotal attachment to said support means so as to raise and lower said shuttle means into and out of feeding position during the initial portions of its feed and return strokes, respectively. The link means is held against movement relative to the feed shuttle and slidable support means between the raising and lowering of said shuttle means to its respective protracted and retracted positions so as to only reciprocate said support means, together with said link and shuttle means, between the aforesaid initial portions of the feed and return strokes of said shuttle means. The initial portions of these strokes are also the terminal portions of the return and feed strokes, respectively. The feed shuttle means may be in the form of an elongated rectangular rack having parallel longitudinal members at its lateral margins with upstanding push means at spaced intervals for engaging and advancing the wood sticks upon the feed stroke of the rack. The push means extend or project above the table throughout the feed stroke of the rack including the initial portion thereof when the links means is swung upwardly from the nonfeeding or retracted position to the feeding or protracted position of said rack; said push means are retracted below said table throughout the return stroke of said rack including the initial portion thereof when said links means is swung downwardly from said feeding or protracted position to said nonfeeding or retracted position of said rack.

DESCRIPTION OF A PREFERRED EMBODIMENT

Figure 1:
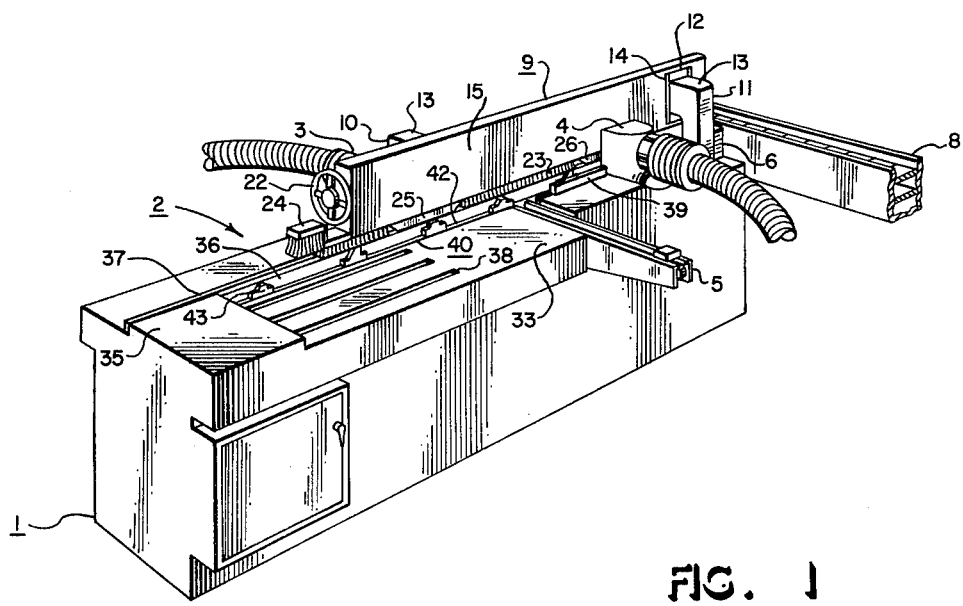
FIG. 1 is a rear perspective view of a dual random length end shaping machine or woodworking apparatus having an infeed assembly or mechanism constructed in accordance with the invention.

In FIGS. 1, 2, 4, 5 of the drawings, the numeral 1 designates the elongate rectangular base frame or housing of a dual random length end shaping machine or woodworking apparatus comprising an infeed assembly or mechanism 2 embodying the principles of the invention adjacent one end of the base frame, first and second or anterior and posterior spaced end shapers 3, 4 for serrating or cutting finger joints or otherwise shaping the ends of wood sticks of random length such as relatively short sticks and/or blocks W, a transverse transfer conveyor 5 for shifting said sticks or blocks linearly between the end shapers, an adhesive or glue applicator 6 adjacent the outfeed end of said base frame, and a horizontal row of holddown rollers 7 extending transversely across said outfeed end in overlying parallel spaced alignment with a discharge conveyor 8. The elongate narrow rectangular housing or frame 9 of a pressure head assembly overlies the longitudinal medial portion of base frame 1 in parallel spaced relationship, being supported by a pair of angular anterior and posterior upright frame members or pedestals 10, 11 upstanding from said base frame adjacent and downstream of first end shaper 3 on the anterior side of the housing and between the second end shaper 4 and the glue applicator 6 on the posterior or opposite side of said housing.

Figure 4:
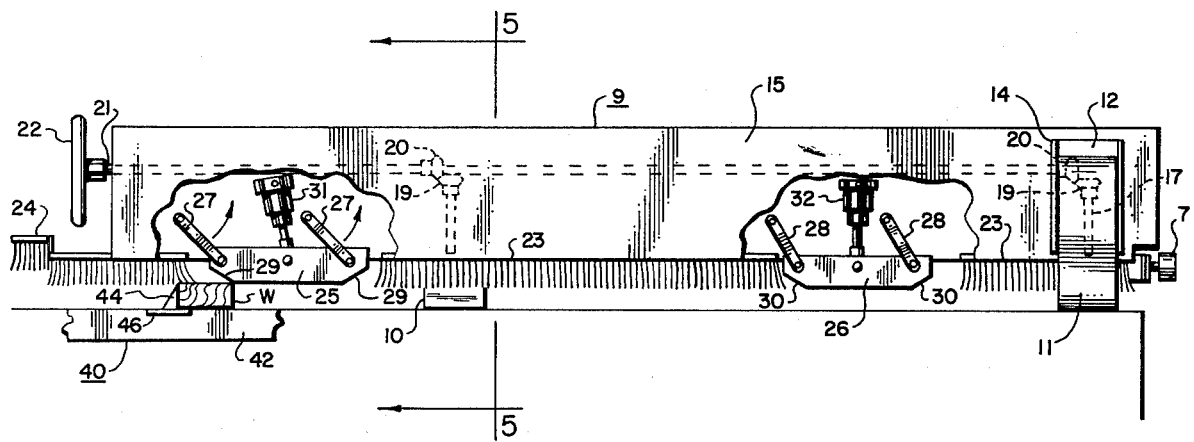
FIG. 4 is an enlarged side elevational view, partly broken away, of said infeed assembly.
Figure 5:
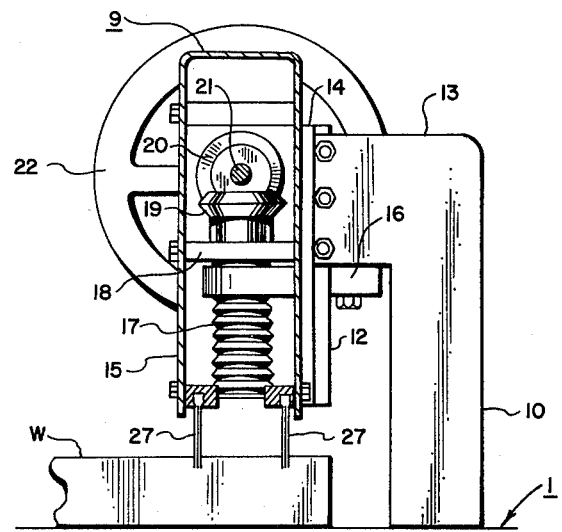
FIG. 5 is a vertical sectional view, on an enlarged scale, taken on the line 5—5 of FIG. 4.

As shown in FIGS. 1, 5, an upright slide plate 12 is secured to the inwardly projecting upper end 13 of each pedestal 10, 11 and is slidably confined between a pair of spaced upright guides 14 mounted on the contiguous upright side wall 15 of housing or frame 9 to permit vertical adjustment of the pressure head assembly in accordance with the thickness of wood sticks and/or blocks W. A horizontal plate 16 underlies and is fastened to the underside of each inwardly projecting upper end 13 of each pedestal and extends inwardly therefrom through the adjacent housing side wall 15 into said housing for screwthreaded engagement with an upright screwthreaded short rod or stud 17 that projects therethrough. The latter has an unthreaded upper end portion that is adapted to project through a horizontal support member 18 extending transversely within the interior of housing 9. A miter gear 19 is fixed to the upper end of each stud 17 and overlies each support member 18 for coacting therewith to rotatably suspend said stud. Miter gear 19 meshes with a complementary gear 20 secured to one end of a horizontal shaft 21 extending longitudinally within the pressure head assembly housing and through the opposite end wall of the latter. The projecting end of horizontal shaft 21 has a hand wheel 22 mounted thereon for turning said shaft to impart rotation to the miter gears 20, 19 and screwthreaded rod 17 of each pedestal, as shown in broken lines in FIG. 4, to adjust the relative elevation of housing 9.

Preferably, elongate rectangular guide brushes 23 extend longitudinally and horizontally of the housing and depend below the lower margins of housing walls 15 for engaging wood sticks and/or blocks W, whereby travel of said sticks or blocks is resisted sufficiently to maintain them in relative perpendicular relationship. As shown at 24, in FIGS. 1, 2, 4, a pair of the brushes may project from the infeed end of the housing for initial engagement with the blocks and/or sticks, and the endmost or leading brush may be elevated so as to provide a tactile warning of the proximity of moving parts of the machine.

Brushes 23 are continuous with the lower margin of housing 9 except at or in transverse alignment with spaced end shapers 3, 4 where pressure elements or holddown shoes 25, 26, respectively, are pivotally suspended within housing 9 adjacent their end portions from the lower ends of respective pivotally connected links 27, 28 so as to depend below said housing for engaging and preventing displacement of sticks and/or blocks W during the shaping of the ends thereof. Each holddown shoe 25, 26 may be of any suitable construction and, as shown in FIG. 4, may be of elongate generally rectangular configuration and have the lower margins of its ends relieved so as to provide inclined or slanted surfaces 29, 30, respectively, to facilitate riding of the blocks or sticks beneath said shoes. For constantly urging each of the pressure elements or shoes downwardly relative to the pressure head assembly housing, a pneumatic assembly or other suitable pressure responsive member 31, 32 is pivotally suspended between the housing walls 15 with its projecting lower end or rod pivotally connected to each respective shoe 25, 26. It is noted that these pressure head assemblies form no part of the present invention other than for cooperating with infeed assembly 2.

Figure 2:
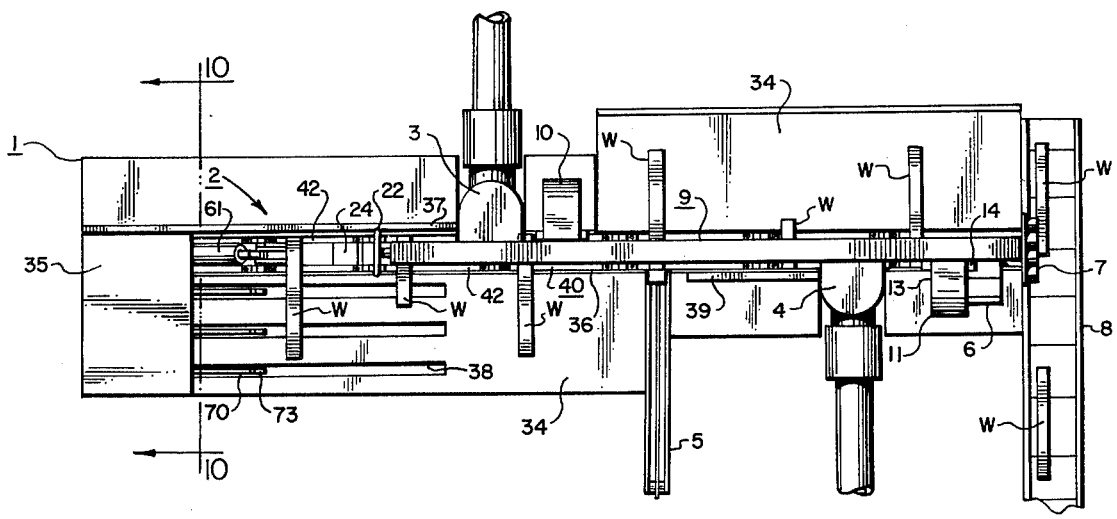
FIG. 2 is a top plan view of the end shaping machine and the feed assembly.

As shown in FIGS. 1, 2, base frame or housing 1 of the dual end shaping mechanism has horizontal generally flat first or anterior and second or posterior beds or tables 33, 34 at its respective infeed and outfeed portions or sections for coacting with infeed assembly 2 as well as with end shapers 3, 4, transfer conveyor 5 and glue applicator 6. Tables 33, 34 are elongate, rectangular and disposed in offset or staggered relationship with the transfer conveyor extending transversely of the inner or discharge end portion of the first or infeed table 33 for directing sticks and/or blocks W from said infeed table transversely onto the inner or infeed end portion of said second or outfeed table 34.

A rectangular corner portion 35 of the posterior outer end of the infeed table may be elevated to provide space for accommodating the drive mechanism (not shown) of the infeed assembly. A wide slot or elongate rectangular opening 36 (FIGS. 1, 2, 10) extends longitudinally of tables 33, 34—in spaced parallel relation to their lateral margins—from the inner corner of elevated table end portion 35 to the discharge end portion of the second or outfeed table in spaced underlying vertical alignment with pressure head assembly housing 9 whereby the wide slot has an open right or outfeed end. As shown at 37, a fence or guide rail for contact by the anterior ends of sticks or blocks W is coextensive with the anterior longitudinal margin of wide slot 36 from its infeed end to first or anterior end shaper 3.

One or more relatively narrow slots or elongate openings 38, of slightly less length than fence 37, may be provided in table 33 in spaced parallel relation to the wide slot as well as to one another; and these slots coact to accommodate infeed assembly 2 and particularly the operation thereof. A similar guide rail or fence 39 (FIGS. 1, 2) for contact by the posterior ends of the blocks or sticks is provided at the posterior longitudinal margin of the wide slot between transverse transfer conveyor 5 and posterior or second end shaper 4.

The infeed assembly, as best shown in FIGS. 3, 6–10, includes an elongate rectangular shuttle or feed rack 40 disposed within wide slot 36 in parallel spaced relationship and having a pair of spaced parallel horizontal rails or longitudinal members 42 at its lateral margins fastened together by suitable transverse rods or struts 41 at suitable intervals. Upstanding push lugs or block backups 43, 44 rest on and are secured to rails 42, such as by screws 47 (FIG. 3) extending through flanged bases or feet 45, 46, respectively, of the lugs at suitable intervals and at the ends of said rails. Push lugs 44 are of greater height or upright length than push lugs 43 so as to project thereabove for coaction with holddown shoes 25, 26 to prevent displacement of the short sticks and/or blocks during shaping of the ends of said sticks and/or blocks. As shown, the lugs of each rail of the shuttle rack are equally spaced and are aligned transversely with the lugs of the outer rail.

Figure 10:
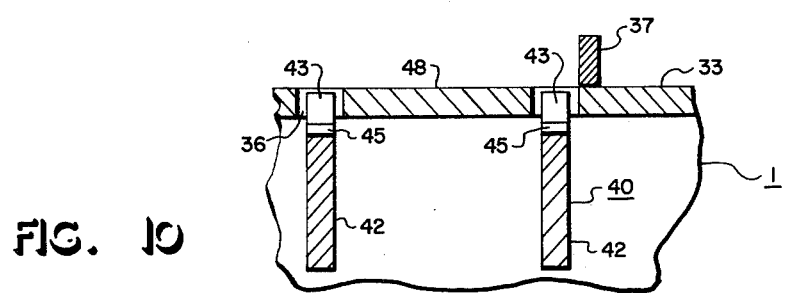
FIG. 10 is a transverse vertical sectional view on an enlarged scale and taken on the line 10—10 of FIG. 2.

As best shown in FIG. 10, shuttle or feed rack 40 straddles an elongate rectangular horizontal bed rail or bar 48 that is mounted in and is generally coextensive with the wide slot in spaced parallel relationship between rails 42 of said rack. Bed rail 48 is adapted to support the inner ends of short sticks and/or blocks W and coact with brushes 23 and pressure elements or holddown shoes 25, 26 to maintain said blocks and/or sticks against upward displacement and sluing or pivotal movement during end shaping thereof. Shuttle or feed rack 40 is mounted for clockwise reciprocal movement in a generally elliptical path or rhombic orbit, as indicated in FIGS. 6–9 and as will be explained hereinafter, for feeding and advancing the sticks or blocks through the end shaping machine.

Infeed assembly 2 overlies and is reciprocally mounted by spaced horizontal rectangular saddle members or blocks 50, 51 overlying and slidably connected to spaced complementary slide members or plates 52, 53, respectively, that rest on and are secured to a suitable elongate support 49. Each slide member is of greater length than its saddle member to permit reciprocation of each saddle member from the retracted nonfeeding position of the infeed assembly (FIG. 6) to the protracted infeed position of pusher lugs 43, 44 (FIGS. 7, 8) of said assembly. A horizontal rod 54 extends between and joins together reciprocal saddle members.

Figure 3:
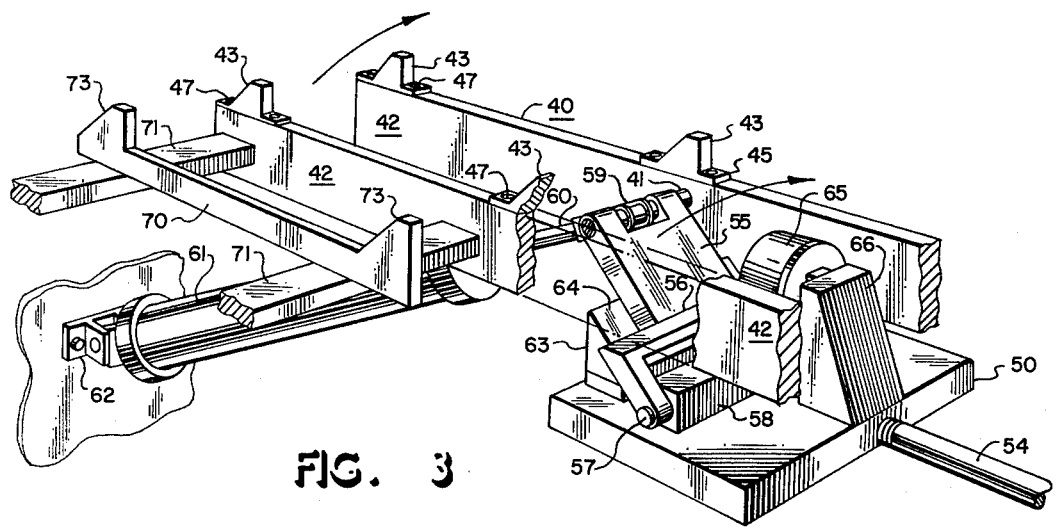
FIG. 3 is an enlarged perspective view, partly broken away, of said infeed assembly in its retracted nonfeeding position.

As best shown in FIG. 3, each saddle member is pivotally attached to longitudinal rails 42 of rack 40 by a suitable upright link or hinge plate 55 having a relatively wide transverse yoke 56 projecting from its lower end and straddling said saddle member. Pivot pins 57 project laterally from the ends of a transverse bar 58 overlying and secured to each saddle member 50, 51 for connection with the free lower ends of the arms of yoke 55. The upper end of each yoke is pivotally fastened to the transverse rail connecting rod 41 at the left end of the rack by a clevis 59 at the upper outer end of a piston rod 60 projecting from a pneumatic cylinder 61, having its lower end pivotally mounted as shown at 62 in FIGS. 3, 6–9, that is adapted to reciprocate the rack elliptically for protracting and retracting push lugs 43, 44 to feed and advance sticks and/or blocks W through the end shaping machine.

Figure 6:
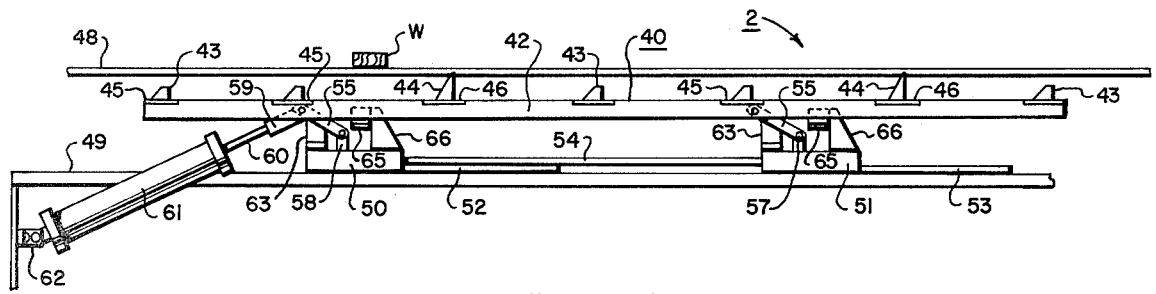
FIG. 6 is a schematic side elevational view of said infeed assembly in its nonfeeding position with its upright pusher lugs retracted.
Figure 7:
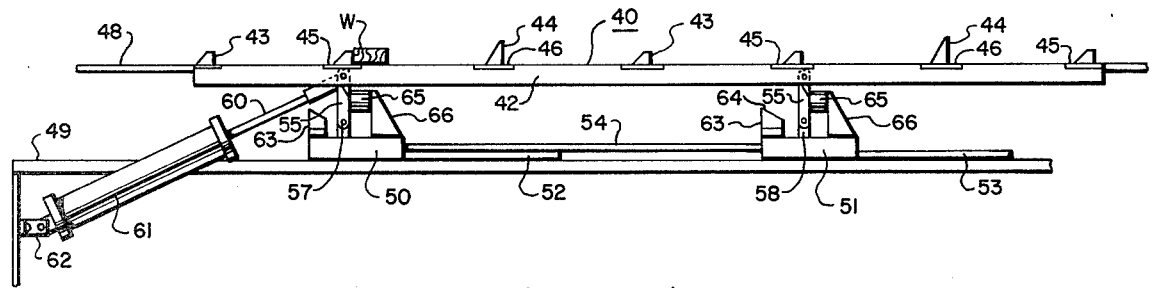
FIG. 7 is a view, similar to FIG. 6, showing said assembly in its initial feeding position with said pusher lugs protracted.

For supporting rack 40 and its push lugs in the retracted position shown in FIGS. 3, 6, an angular bumper 63 upstands from the infeed or left end portion of each saddle member adjacent its overlying transverse bar 58 and has an inclined upper surface 64 for engagement by link or hinge plate 55. The rack is swung from its retracted to its protracted position by clockwise pivoting of the link or hinge plate to its upright position (FIG. 7) upon outward reciprocation of piston rod 60 from cylinder 61 until said link strikes the upright surface of a shock absorber 65 supported by an upright bumper 66 upstanding from the right end portion of each saddle member 50, 51. During this forward movement or feed stroke of rack 40, its lugs engage short sticks and/or blocks W.

Figure 8:
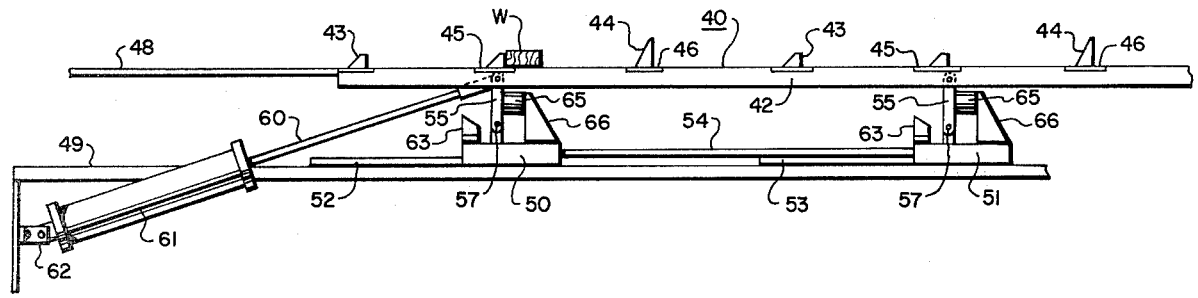
FIG. 8 is a view similar to FIG. 7 and illustrating said assembly at the terminal end of the infeed stroke of said protracted pusher lugs.

As shown in FIG. 8, additional or continued outward movement of the piston rod from its cylinder imparts reciprocal movement to the saddle members relative to slide plates 52, 53 in a right hand direction whereby push lugs 43, 44 of the feed rack advance sticks or short blocks W to and through the end shaping machine so as to outfeed said sticks or short blocks onto discharge conveyor 8. It is noted that wide slot 36 of tables 33, 34 is of greater length than shuttle or feed rack 40 so that the left end of the retracted rack (FIG. 6) is at the left end of said slot and that the right end of said rack when fully protracted (FIG. 8) is at the right end of said slot. Although the feed rack and its push lugs are in a protracted position in FIG. 7, the piston rod is not extended to its full length whereby said rack and lugs are merely elevated and the slide plates remain stationary.

Figure 9:
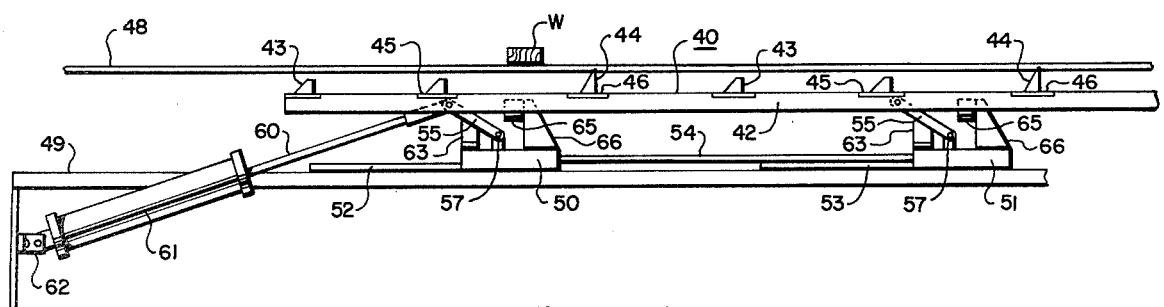
FIG. 9 is a view, similar to FIG. 8, showing said assembly in its initial reverse reciprocal position with said pusher lugs retracted to nonfeeding position.

As shown in FIG. 9, initial inward reciprocation of piston rod 60 relative to its cylinder 61 pivots each link 55 counterclockwise or toward the left into engagement with inclined surface 64 of each bumper 63 and merely swings the rack with its push lugs to the left toward retracted position. Continued inward movement of the piston rod returns rack 40 with its lugs 43, 44 (FIG. 6) to nonfeeding position. It is noted that the spacing between adjacent push lugs and the stroke or travel of the feed rack or shuttle are of the same length, whereby the wood short sticks and/or blocks are advanced by the push lugs upon each stroke of said rack a distance sufficient to permit engagement of said sticks and/or blocks by the next preceding lugs.

As mentioned, one or more relatively narrow short elongated openings or slots 38 may be provided in table 33 to accommodate one or more complementary outrigger members or bars 70 (FIG. 3) having a push lug or block backup 73, similar to push lugs 43 of rails 42 of feed rack 40, upstanding from each of its end in transverse alignment with the push lugs at the inner ends of said rails and the adjacent preceding lugs. Outrigger bars 70 may be connected to the adjacent rail of the feed rack or shuttle by suitable transverse members 71 extending therebetween for reciprocal movement therewith. Although not illustrated, it is noted that one or more similar outriggers may be provided at the outfeed end of the feed rack for coacting with said rack and second or outfeed table 34. These outriggers or outrigger members are adapted to engage the outer portions of wood sticks of greater length than the short blocks to prevent sluing of said sticks. The spacing between transversely aligned push lugs of the parallel rails of the rack is sufficient to control the movement of short blocks.

The foregoing description of the invention is explanatory thereof and various changes in the size, shape and materials, as well as in the details of the illustrated construction may be made, within the scope of the appended claims, without departing from the spirit of the invention.

I claim:

1. In a woodworking apparatus that has at least one end shaper and table means for supporting sticks of random length during their travel through the apparatus and means overlying and coacting with the table means for holding the sticks against displacement during the shaping of their ends,
   an infeed assembly for advancing said sticks through said apparatus comprising
   elongate shuttle means extending and movable longitudinally of said table means in a generally rhombic orbit and having upstanding push elements adapted to project above said table means during the feed stroke of the shuttle means for engagement with said sticks and adapted to retract below said table means during the return stroke of said shuttle means,
   reciprocably mounted means underlying and supporting the elongate shuttle means,
   a pair of spaced parallel link means of equal length extending between and pivotally connecting said shuttle means to the supporting means in spaced parallel relationship,
   one end of each link means having pivotal connection with said shuttle means and the opposite end of each link means having pivotal connection with said supporting means for maintaining the spaced parallel relationship of said shuttle and supporting means,
   actuating means for initially pivoting each link means upwardly about the axis of its pivotal connection with said supporting means to an upright position so as to elevate said shuttle means and project its upstanding push elements above said table means for engagement with said sticks,
   stop means for engagement by at least one of the upright link means to prevent continued pivotal movement thereof and thereby impart straight line longitudinal movement to said shuttle means as well as reciprocal movement to said supporting means to complete the feed stroke of said shuttle means, the actuating means being reversible to initially pivot said link means downwardly in a reverse direction from its upright position so as to lower said shuttle means and retract its push elements below said table means, and limit means for engagement by at least one of said downwardly pivoted link means to prevent continued pivotal movement thereof whereby straight line longitudinal movement is imparted to said shuttle means to complete the return stroke of said shuttle means, said actuating means being pivotally mounted and being pivotally connected directly to at least one of said link and shuttle means so as to permit arcuate movement of said actuating and link means relative to each other as well as to said shuttle means.

2. An infeed assembly as defined in claim 1 wherein said shuttle means includes a connected pair of spaced parallel elongate members extending longitudinally of said table means, said upstanding push elements being mounted on the elongate shuttle members in transverse alignment, both of the shuttle members having pivotal connection with the aforesaid one end of said link means.

3. An infeed assembly as defined in claim 1 wherein both of said upright link means are adapted to engage the stop means, and both of said downwardly pivoted link means are adapted to engage the limit means, said stop and limit means being mounted on and upstanding from said supporting means, said link means being pivotally attached to said supporting means between said stop and limit means.

4. An infeed assembly as defined in claim 3 wherein said supporting means includes a pair of slidable blocks each having one end of said link means pivotally attached thereto between the stop and limit means.

5. An infeed assembly as defined in claim 3 wherein said shuttle means includes a connected pair of spaced parallel elongate members extending longitudinally of said table means, said upstanding push elements being mounted on the elongate shuttle members in transverse alignment, both of said shuttle members having pivotal connection with the aforesaid one end of both of said link means.

6. An infeed assembly as defined in claim 5 wherein said supporting means includes a pair of slidable blocks each having one end of said pair of link means pivotally attached thereto.

7. An infeed assembly as defined in claim 5 wherein said shuttle means includes at least one other longitudinal shuttle member of less length than and attached to at least one of said pair of elongate shuttle members in spaced parallel relationship for movement therewith, the said other shuttle member having similar upstanding push elements adapted to engage the outer end portions of relatively long sticks.

8. An infeed assembly as defined in claim 1 including common pin means extending transversely of and pivotally connecting said one end of at least one of said link means to said shuttle means at said point of pivotal connection therebetween, said actuating means comprising longitudinally reciprocal rod means having its outer end pivotally attached by the common pin means to said link and shuttle means.

9. An infeed assembly as defined in claim 1 wherein said actuating means comprises a longitudinal reciprocal rod having its outer end pivotally attached to at least one of said shuttle and link means.

10. In a woodworking apparatus that has at least one end shaper and table means for supporting sticks of random length during their travel through the apparatus and means overlying and coacting with the table means for holding the sticks against displacement during the shaping of their ends, an infeed assembly for advancing said sticks through said apparatus comprising elongate shuttle means extending and movable longitudinally of said table means in a generally rhombic orbit and having upstanding push elements adapted to project above said table means during the feed stroke of the shuttle means for engagement with said sticks and adapted to retract below said table means during the return stroke of said shuttle means, reciprocally mounted means underlying and supporting the elongate shuttle means, a pair of spaced parallel link means of equal length extending between and pivotally connecting said shuttle means to the supporting means in spaced parallel relationship, one end of each link means having pivotal connection with said shuttle means and the opposite end of each link means having pivotal connection with said supporting means for maintaining the spaced parallel relationship of said shuttle and supporting means, actuating means for initially pivoting each link means upwardly about the axis of its pivotal connection with said supporting means to an upright position so as to elevate said shuttle means and project its upstanding push elements above said table means for engagement with said sticks, stop means for engagement by at least one of the upright link means to prevent continued pivotal movement thereof and thereby impart straight line longitudinal movement to said shuttle means as well as reciprocal movement to said supporting means to complete the feed stroke of said shuttle means, the actuating means being reversible to initially pivot said link means downwardly in a reverse direction from its upright position so as to lower said shuttle means and retract its push elements below said table means, and limit means for engagement by at least one of said downwardly pivoted link means to prevent continued pivotal movement thereof whereby straight line longitudinal movement is imparted to said shuttle means to complete the return stroke thereof, said actuating means being pivotally mounted and being pivotally connected to said one end of at least one of said link means at the point of pivotal connection between said shuttle and link means so as to permit arcuate movement of said actuating and link means relative to each other about the axis of said pivotal connection point.

* * * * *